United States Patent
Murray et al.

(10) Patent No.: US 6,878,390 B2
(45) Date of Patent: Apr. 12, 2005

(54) SEGMENTED ROLLED FOOD ITEM

(75) Inventors: Joseph M. Murray, Wayne, NJ (US); William R. Drummond, Sparta, NJ (US)

(73) Assignee: Kraft Foods Holdings, Inc., Northfield, IL (US)

(*) Notice: Subject to any disclaimer, the term of this patent is extended or adjusted under 35 U.S.C. 154(b) by 231 days.

(21) Appl. No.: 09/976,377

(22) Filed: Oct. 12, 2001

(65) Prior Publication Data

US 2003/0072853 A1 Apr. 17, 2003

(51) Int. Cl.⁷ .................................................. A23P 1/10
(52) U.S. Cl. ..................... 426/76; 426/104; 426/115; 426/274; 426/383; 426/414; 426/517; 426/518
(58) Field of Search ........................ 426/3–5, 76, 104, 426/110, 115, 274, 517, 383, 414, 501, 503, 512, 518, 577; 83/861–865

(56) References Cited

U.S. PATENT DOCUMENTS

| | | |
|---|---|---|
| 3,744,384 A | 7/1973 | Jarritt et al. |
| 3,892,157 A | 7/1975 | Currie et al. |
| 3,894,827 A | 7/1975 | Raley et al. |
| 4,121,960 A | 10/1978 | Focht |
| 4,272,473 A | 6/1981 | Riemersma et al. |
| 4,319,868 A | 3/1982 | Riemersma et al. |
| 4,555,407 A | 11/1985 | Kramer et al. |
| 4,635,316 A | 1/1987 | Towne et al. |
| 4,882,175 A | 11/1989 | Ream et al. |
| 5,014,489 A | 5/1991 | Terminella et al. |
| 5,051,268 A | 9/1991 | Mally |
| 5,061,231 A | 10/1991 | Dietrich et al. |
| 5,205,106 A | 4/1993 | Zimmermann et al. |
| 5,284,667 A | 2/1994 | Zimmermann et al. |
| D358,699 S | 5/1995 | Benham et al. |
| D358,962 S | 6/1995 | Benham et al. |

(Continued)

FOREIGN PATENT DOCUMENTS

| | | |
|---|---|---|
| CA | 2406769 | 4/2003 |
| EP | 1252821 A1 | 10/2002 |
| GB | 2374790 A | 10/2002 |
| WO | WO 89/10697 | 11/1989 |
| WO | WO 96/008971 | 3/1996 |
| WO | WO 97/33822 | * 9/1997 |
| WO | WO 00/08954 | 2/2000 |
| WO | WO 01/26492 | 4/2002 |
| WO | WO 02/082926 | 10/2002 |

*Primary Examiner*—Drew Becker
(74) *Attorney, Agent, or Firm*—Hollander Law Firm, P.L.C.

(57) ABSTRACT

A segmented rolled food item is continuously produced using a rotating segmenting roller having a plurality of parallel circumferential lanes. Each lane contains a series of circumferentially spaced knife edges that are disposed at least substantially parallel to the axis of rotation of the roller. A segmented rolled food item is produced by feeding multiple continuous at least substantially parallel strips of a flowable food product, each of which are deposited on pre-slit parallel strips of support material, between the nip of an upper anvil surface and the lower surface of the rotating segmenting roller. The segmentation of the food strip occurs without segmentation of the support strip. After segmenting, the food strip and the support material are cut into lengths to form leading and trailing ends. Each strip of food is rolled around a leading end of the support material to obtain a segmented rolled food item.

21 Claims, 8 Drawing Sheets

U.S. PATENT DOCUMENTS

| | | |
|---|---|---|
| D360,969 S | 8/1995 | Uecker et al. |
| 5,455,053 A | 10/1995 | Zimmermann et al. |
| 5,478,516 A | 12/1995 | Malm et al. |
| 5,516,542 A | 5/1996 | Zimmermann et al. |
| 5,538,742 A | 7/1996 | McHale et al. |
| D373,231 S | 9/1996 | Gluszak et al. |
| D373,232 S | 9/1996 | Gluszak et al. |
| D373,233 S | 9/1996 | Gluszak et al. |
| D374,969 S | 10/1996 | Gluszak et al. |
| D375,183 S | 11/1996 | Gluszak et al. |
| D375,395 S | 11/1996 | Gluszak et al. |
| D376,037 S | 12/1996 | Gluszak et al. |
| 5,720,998 A | 2/1998 | Proctor et al. |
| 5,723,163 A | 3/1998 | Zimmermann et al. |
| 5,752,364 A | 5/1998 | Benham et al. |
| 5,755,077 A | 5/1998 | Benham et al. |
| 5,846,588 A | 12/1998 | Zimmermann et al. |
| 5,853,836 A | 12/1998 | Zoss |
| 5,876,777 A | 3/1999 | Zimmermann et al. |
| 5,935,613 A | 8/1999 | Benham et al. |
| 5,942,268 A * | 8/1999 | Zimmermann et al. ..... 426/132 |
| 5,958,485 A | 9/1999 | Benham et al. |
| 5,972,392 A * | 10/1999 | Kopecky et al. ............... 426/5 |
| 6,009,781 A | 1/2000 | McNeil |
| 6,077,390 A | 6/2000 | Salman et al. |
| 6,153,233 A | 11/2000 | Gordon et al. |
| 6,183,799 B1 | 2/2001 | Wu et al. |
| 6,190,717 B1 | 2/2001 | Benham et al. |
| 6,200,617 B1 | 3/2001 | Babiarz et al. |
| 6,217,309 B1 | 4/2001 | Jens et al. |
| 6,267,997 B1 * | 7/2001 | Ream et al. ................... 426/3 |
| 6,509,052 B1 | 1/2003 | Benham et al. |
| 6,548,090 B2 * | 4/2003 | Dwivedi ..................... 426/103 |
| 2001/0014362 A1 | 8/2001 | Babiarz et al. |
| 2002/0187236 A1 | 12/2002 | Kaiser |
| 2004/0043134 A1 | 3/2004 | Corriveau et al. |

* cited by examiner

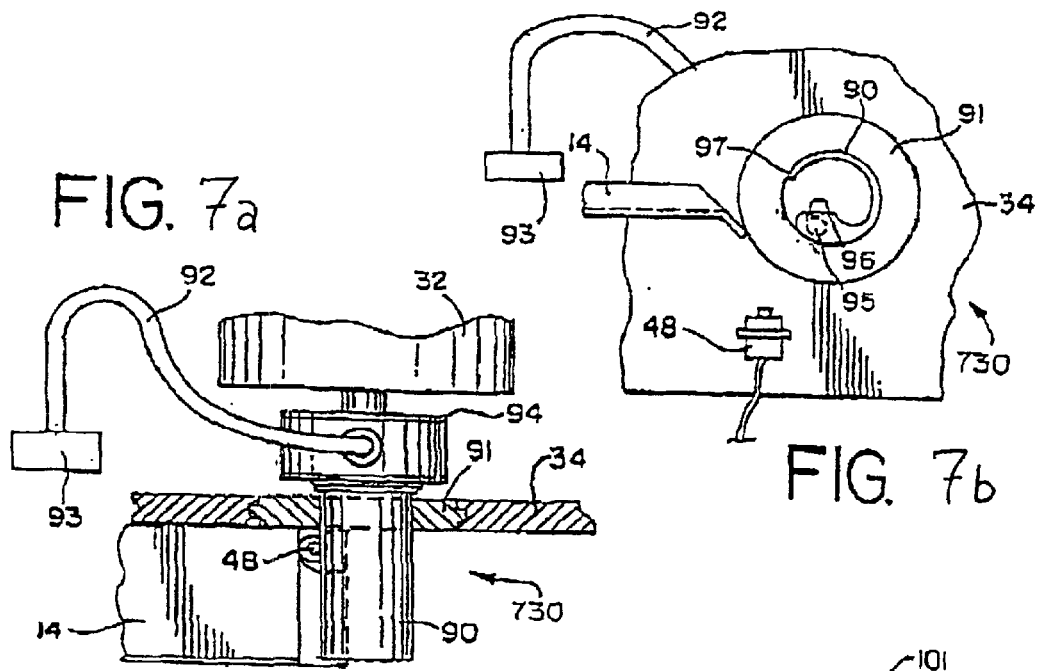
FIG. 7a
FIG. 7b
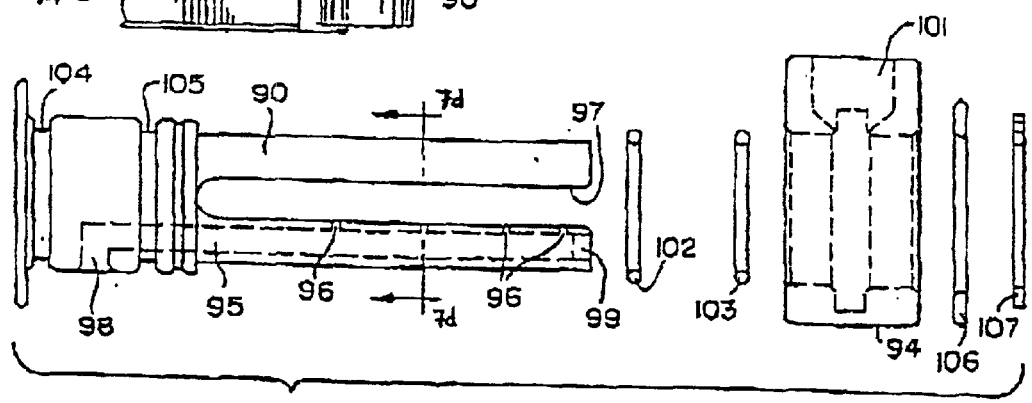
FIG. 7c
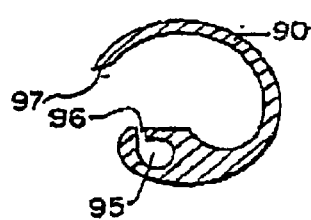
FIG. 7d
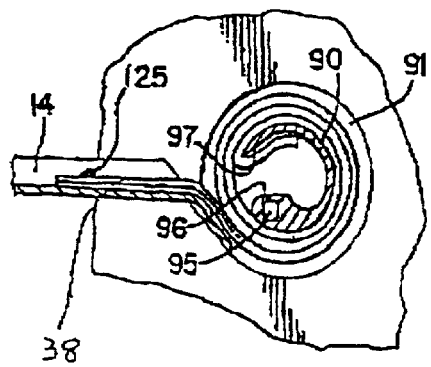
FIG. 7e

SEGMENTED ROLLED FOOD ITEM

FIELD OF THE INVENTION

The present invention relates to a segmenting roller apparatus and to methods for segmenting food items, particularly to an apparatus and to methods for making segmented rolled food items supported on a support material, and more particularly to an apparatus and to methods for fabricating a segmented roll of a confectionary product, such as a strip of a dehydrated fruit-puree, supported on a support material.

BACKGROUND OF THE INVENTION

Snack-type food products which are rolled along their longitudinal axis are consumed by partially unrolling a continuous rolled-up tape to a desired length and then breaking off or tearing off a piece of the food item from the rest of the roll for consumption. For example, U.S. Pat. No. 4,882,175 to Ream et al discloses chewing gum in the form of a rolled-up tape allowing the consumer the chance to break off the desired sized piece to chew, saving the rest for later. U.S. Pat. Nos. 5,205,106, 5,284,667, 5,455,053, 5,516,542 and 5,723,163 to Zimmerman et al. disclose rolled food items made from a dehydrated fruit puree product strip supported on a support material.

However, tearing or breaking off a piece of the food for consumption is difficult for young children and often results in destruction of the food item removed from the roll and destruction of a portion of the remaining food roll. In addition, difficulty encountered in separating the food often leads to excess or complete unraveling, or unrolling of the food roll. In the hands of young children, excessive unraveling may cause portions of the roll to touch the ground leading to wasted products. In addition, young children often separate or break off a longer piece of product than they can consume, leading to product waste.

Perforation of rolled paper products such as paper towels or bathroom tissue for separation of pieces into fixed lengths is disclosed in U.S. Pat. No. 6,009,781 to McNeil. Embossing apparatuses, such as embossing rollers, in the papermaking and tissue arts is disclosed in U.S. Pat. No. 6,077,390 to Salman et al. However, instruments used to segment paper products comprise sharp blades which do not avoid "cold flow" problems encountered in cutting food items. Also, embossing in the paper art increases paper thickness by creating contour in the paper sheet while maintaining its integrity and so would not be used to create a "pop out" or removable design which might compromise the integrity of a self-supporting sheet or film.

Many foods, such as dehydrated fruit puree, formed into thin strips that require a support material such as waxed paper, do not lend themselves to forming rolled food items wherein the food is segmented. Particularly in the case of dehydrated fruit purees which are often tacky, adjacent segments in a strip of dried puree flow together during or after processing so that either the segment no longer exists, or is no longer visible, or any attempt to break apart a segment so deforms the food item that the aesthetic appeal and the intended play value of the food item or the segment that is broken off of it substantially deteriorate.

Cooling during the processing of a rolled strip of a dehydrated fruit puree to render it less tacky, for example to about room temperature, can render the puree less flowable during processing so that it will at least temporarily form segments of a strip of food when packaged. However, the segments of the cooled strip may still tend to flow back together either during the roll-up of the strip or in the package. Moreover, if the strip of food is made too cold, it cannot be rolled-up without breakage because it loses its flexibility. Thus, "cold flow" problems cannot be solved by simply cooling the dehydrated fruit puree during processing.

Likewise, when dehydrated fruit purees used to make strips of food are too tacky, they cannot be embossed or imprinted so that the designs formed by embossing or imprinting remain on the strip of food. In embossing or imprinting, as in segmenting, cooling the fruit puree may allow embossing or imprinting yet may not prevent cold flow during roll-up or in the package so that the so-formed bosses or imprints are no longer recognizable.

In accordance with the present invention, a segmented rolled food item, and a method and an apparatus for making the same, permit the easy and discrete removal of one or more segments of food and allow the consumer, especially young children, to break off the desired size of one or more pieces to play with or to eat while saving the rest for later, thus creating a novelty form of merchandising for the food. The separation of segments into predetermined or fixed lengths may be achieved by youngsters without substantial, or no distortion of the separated pieces or the remaining roll. Additionally, the rolled food item may be repeatedly unrolled and re-rolled without undesired separating of the food segments.

SUMMARY OF THE INVENTION

The present invention provides an apparatus comprising a segmenting roller for segmenting a continuous strip of food product while it is supported on a rollable support material. Even though the food product is segmented by the roller, the support material remains unsegmented and the food product can generally be repeatably unrolled and re-rolled into a tape or roll without separation of the food segments from each other. The roller may also comprise a plurality of embossing, imprinting or engraving cups having a knife-edge or embossing edge that protrudes radially from the surface of the roller to emboss, imprint, or engrave a substrate supported on a support material. In addition, the present invention provides food items as well as methods for the fabrication of such food items, which in the preferred form are rolled and segmented strips of food coiled within a strip of support material. In a more specific embodiment, the present invention provides a method for making segmented rolled food items comprising a confectionary product deposited as strips on strips of the support material, wherein the segmentation allows a consumer, such as a young child, to readily remove one or more segments of the rolled food item. Removal may be achieved by pulling only one or more than one segment apart from the rest of the strip of food with the fingers to play with or to eat, saving the rest for later. The segments may be separated along a segmentation or perforated cut with no or substantially no distortion of the separated pieces or the remaining roll.

The segmenting apparatus according to the presently claimed invention comprises a rotating segmenting roller comprising on its surface a plurality of parallel circumferential bands or lanes, each of which contains a series of circumferentially spaced knife edges that are disposed at least substantially parallel to the axis of rotation of the roller and that project radially outward from the surface of the roller. The present invention also provides a flat or substantially flat anvil surface on which travel multiple continuous parallel strips of food, each supported on a strip of support material. The anvil surface is disposed beneath the roller to form a gap between the upper anvil surface and the lower roller surface to allow the passage of said strips of food underneath the rotating roller, thereby segmenting each of the multiple parallel strips of food.

The present invention also provides a method for segmenting food strips supported on a support material while they are still in a flowable state, without segmenting the strip of support material. In embodiments of the method of the present invention, a food item may be segmented by feeding multiple parallel continuous strips of a flowable food product deposited on pre-slit parallel strips of support material between the upper surface of an anvil and the lower surface of a rotating segmenting roller.

A segmented rolled food item according to the present invention comprises a strip of support material having leading and trailing ends defining its length and first and second side edges defining its width, and a strip of food supported upon the strip of support material. The strip of food supported upon the strip of support material may be segmented so that one or more segments can be broken off of the strip by slight hand pressure exerted by a young child without substantially distorting the separated segment or the remaining portion of rolled-up food. The strip of food supported on the support material has side edges and a length which does not extend beyond the leading and trailing ends of the support material. In the rolled food item, the strip of support material and the strip of food supported thereon are rolled around their leading ends into a roll having multiple rotations with the strip of support material located on the outside of the roll. In a preferred embodiment, the strip of food comprising the rolled food item is a strip of a sweetened dehydrated fruit puree of a thinness requiring external support and which dries to form a non-tacky film.

BRIEF DESCRIPTION OF THE DRAWINGS

The present invention is further illustrated by the accompanying drawings wherein:

FIGS. 7a and 7b depict, respectively, top and side views of an air winding mechanism.

FIGS. 7c and 7d depict partial views of an air winding mechanism.

FIG. 7e depicts an air winding mechanism containing a partially wound up roll of food product with a drop of adhesive near the trailing end.

DETAILED DESCRIPTION OF THE INVENTION

The present invention provides a rotating segmenting roller which simultaneously segments, or perforates, or partially severs, or scores each of a plurality of continuous strips of food into a multi-segmented strip. Each multi-segmented strip is still windable or rollable into a roll or tape even though it contains a plurality of readily separable segments of food. In preferred embodiments, the rotating segmenting roller also embosses, imprints, or engraves the food strip with a design. The roller segments, scores, partially cuts, or perforates the food strip into segments and embosses, imprints, or engraves the food strip without cutting, perforating, embossing, imprinting, or engraving a flexible support material for the food strips. The bottom surface of the embossed, imprinted, or engraved segmented food strip remains substantially flat while the top surface is imparted with indentations or recesses which form a desired shape or figure.

Figure 1:
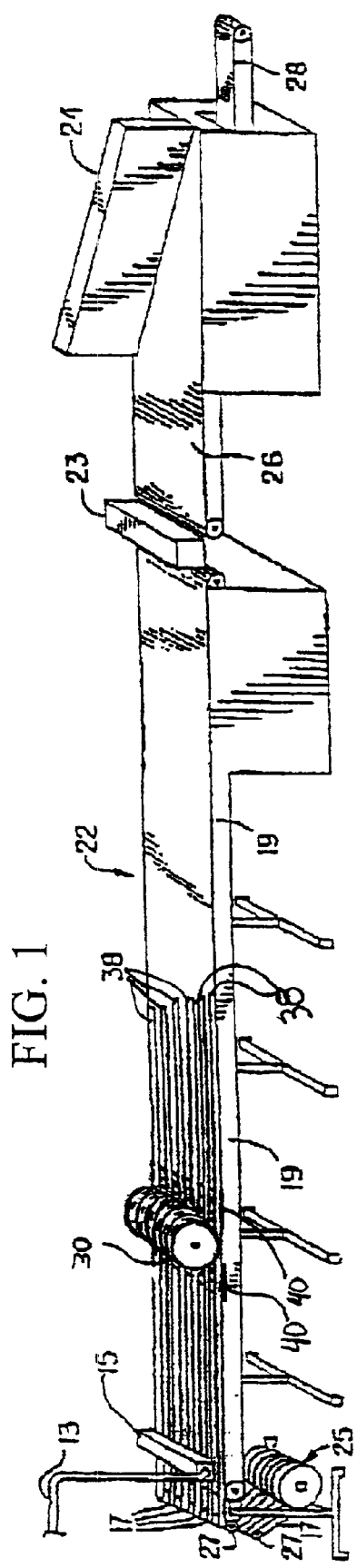
FIG. 1 depicts an assembly for making a rolled-up food item.

According to the teachings of the present invention, an assembly line 22 for producing a rolled, segmented food item in which no label is applied to hold the roll closed is shown in FIG. 1. Assembly line 22 includes an extruder 15 for forming a plurality of spaced, parallel, narrow strips of food 38 of a thinness requiring external support upon a pre-slit continuous strip of support material 17. Strips of pre-slit paper support material 17 are fed from a paper feeder 25 and after extending around the customary tension rollers 27 are fed onto a carrier conveyor 19 and are urged toward an extruder 15. Food 38 may be heated in an extruder 15 to a temperature to become flowable and may then be deposited on each individual strip of paper 17. The carrier conveyor 19 then transports and cools the food product from beneath the extruder to the rotating segmenting roller 30.

In a preferred embodiment of the present invention, the step of providing multiple parallel continuous strips of a flowable food product 38 preferably comprises extruding a dehydrated fruit puree through multiple parallel die slits in an extruder 15. Each of the extruder die slits may be arranged above a carrier conveyor 19 carrying multiple parallel continuous strips of a support material 17 so that the step of extruding the food effectively deposits each of the strips of food onto one continuous strip of support material. Preferably, a guide means 40 comprising a metal spacer bar may be disposed downstream of the extruder 15 to keep the strips of support material 17 with food thereon at least substantially parallel to each other. Similar metal spacer bars or guide means 40 may be disposed upstream and/or downstream of the other components located along the assembly line 22 downstream of the extruder 15.

In embodiments of the invention, the dehydrated fruit puree exiting the extruder may have a temperature of from about 150° F. to about 230° F., generally from about 190° F. to about 210° F. To achieve a consistency and viscosity for segmenting and embossing or imprinting, the extruded strips of food may be cooled to achieve a product temperature of from about 60° F. to about 110° F., preferably a product temperature of from about 75° F. to about 90° F., at the point it passes under the segmenting roller. If the product is too warm during segmentation by the segmenting roller, the product tends to flow back together or tends to reform into an integral piece so as to substantially reduce or eliminate a segmented cut. If the product is cooled too low, it tends to become excessively stiff and can not be rolled or breaks upon rolling. The applicants have found that use of a solids content of the food 38, as extruded, of about 84% by weight to about 92% by weight, preferably from about 86% by weight to about 88% by weight, provides a strip of food 38 having a stiffness and resistance to cold flow for achieving segmenting and embossing or imprinting and the flexibility at processing temperatures for making a rolled food item in accordance with the present invention. In a preferred embodiment, the food 38 is a sweetened dehydrated fruit-based material which contains substantially no corn syrup and which therefore has a non-tacky property. However, any flowable, low tensile strength food which is non-tacky can be used, including gum, chocolate, other confectionary products and cheese.

Support material 17 may be formed of any suitable material such as polyethylene, waxed or polyethylene-sized paper or silicon parchment paper which has the necessary strength to support food without tearing and which lacks bulk, thereby allowing the rolling of food and support material 17 into a compact food piece and allowing food to be easily separated therefrom for consumption. The support material 17 may be preprinted with designs and/or indicia, as desired.

While being slowly cooled, the parallel strips of food 38 on a support material 17 are carried to the rotating segmenting roller 30 wherein the segmenting step is carried out while the food is still flowable. The speed of the carrier conveyor 19 and/or the speed of the rotation of the segmenting roller 30 can be adjusted so that the roller 30 rotates at a speed which allows segmenting of the food strips 38 at a set predetermined length while it passes underneath the roller 30.

Figure 2:
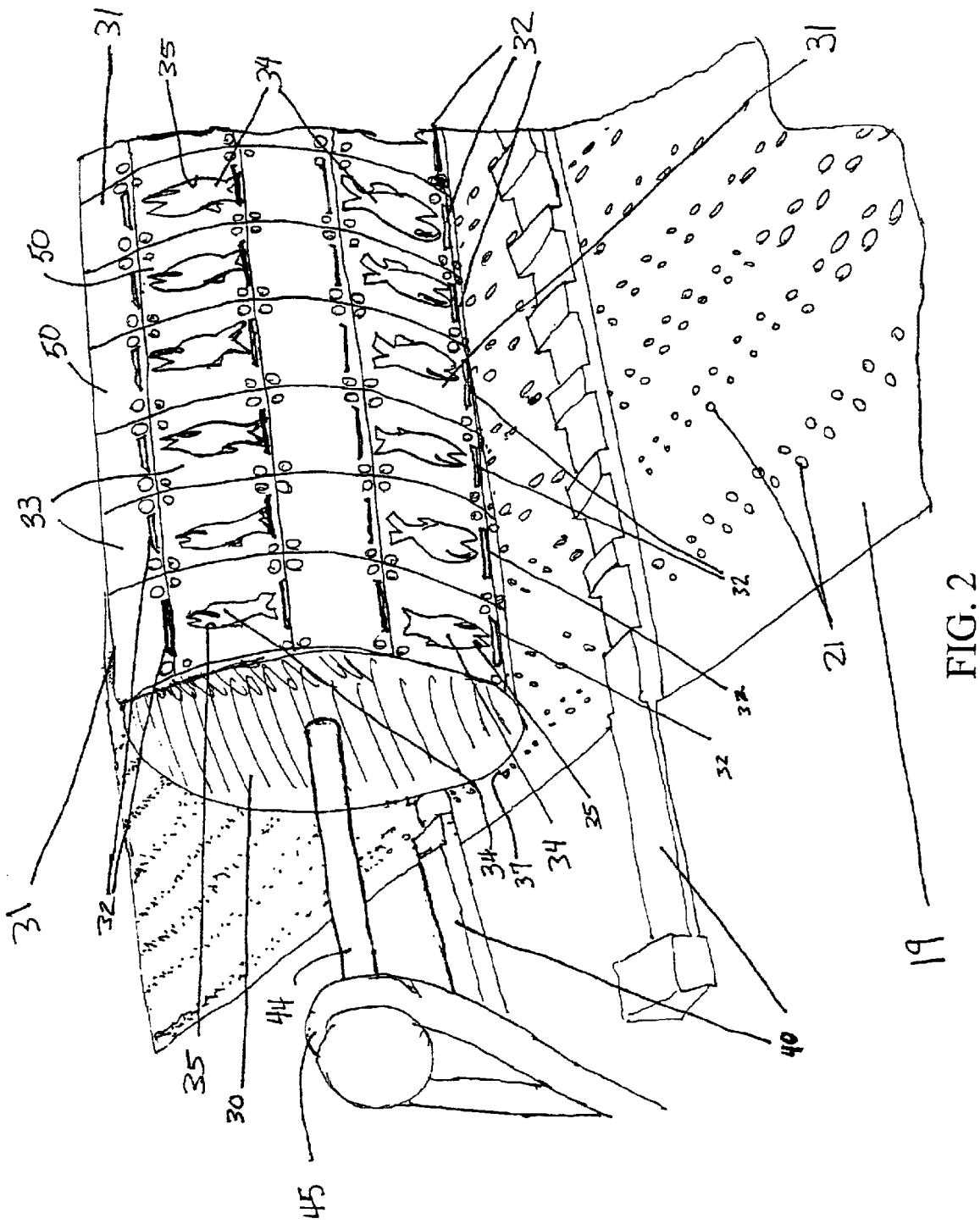
FIG. 2 depicts a partial view of a roller having thereon segmenting edges and embossing cups.

As shown in FIG. 1 and FIG. 2, the segmenting roller 30 is positioned atop the carrier conveyor 19, thereby forming a gap 37 between the roller 30 and the conveyor 19 which allows the multiple strips of food 38 on a support material 17 to pass underneath the roller 30. The gap 37 formed atop the conveyor 19 and beneath the roller 30 is sufficiently small that the upper surface of the conveyor 19 acts as an anvil against which the knife edges 32 of the rotating roller 30 abut at their lowest point to segment the strips of food 38 passing through the gap 37. In segmenting food, the support material 17 is neither cut, perforated, scored nor segmented. Therefore, according to the present invention, the segmenting step enables one to obtain a rolled up food item from which the consumer, particularly young children, such as 3 to 7 years of age, can readily remove one or more segments of a strip of food 38 from the rest of the strip of food 38 by pulling the segment(s) and the rest of the strip apart with the fingers.

As shown in FIG. 2, the present invention provides a segmenting apparatus comprising a rotating segmenting roller 30 having on its surface a plurality of parallel circumferential bands or lanes 31, each of which contains a series of circumferentially spaced knife edges 32 that may be disposed parallel or substantially parallel to the axis of rotation of the roller 30 and that project radially outward from the surface 33 of the roller 30. Multiple continuous parallel strips of a flowable food 38 each supported on a strip of support material 17 travel on a flat or substantially flat anvil surface 19 which is disposed beneath the roller 30 to form a gap 37 between the anvil surface 19 and the roller surface 33 to allow the passage of the strips of food underneath the roller 30. When the strips of food 38 pass underneath roller 30, the rotation of the roller 30 segments each of the multiple parallel strips of food 38.

The flat anvil surface 19 preferably comprises a carrier conveyor on a table with cooling coils located underneath of the carrier conveyor which carry chilled water. The carrier conveyor may have perforations 21 to assist in cooling the food product to a temperature for segmenting, embossing and rolling. To maximize cooling efficiency, the perforations 21 may be disposed in the carrier conveyor 19 in a multiplicity of lanes directly beneath each of the strips of support material 17. Likewise, conveyor 26 and all other conveyors used in the methods according to the present invention may have perforations 21 to help maintain the product temperature within a desired range so that it remains flexible and non-brittle. Generally, further cooling with cooling coils is not needed downstream of the segmenting roller.

In a preferred embodiment of the present invention, as shown in FIG. 2, the surface 33 of the rotating segmenting roller 30 provides within each of a plurality of circumferential bands or lanes 31 a series of circumferentially spaced knife edges 32. The knife edges 32 are spaced so as to segment each of the multiple parallel strips of food 38 at a predetermined interval, for example up to about every six inches, preferably about every one to three inches, e.g. about every 2½ inches. The knife edges 32 used for segmenting may have a wide top edge that can be rounded or flat in cross-section, and are generally blunt. In embodiments of the invention, the knife edges 32 may have a substantially flat top surface and a substantially flat side surface perpendicular thereto. Knife edge 32 is sufficiently wide so that the food is separated or displaced or flows away from the knife edge 32. The displacement is such so that segments in a segmented strip of food 38 do not or substantially do not flow back together across the top surface of the strip of food 38 during processing and so that the segments are not re-joined during winding or roll-up so as to prevent easy separation of segments along the segmentation or perforation cut line. Generally, the segmenting, cutting, perforation, or scoring penetrates the food item as deep as possible to assist in separation of the segments by hand, but without cutting all the way through the food strip so as to permit rolling and unrolling of the food strip without separation of the segments. The depth of the cut or impression may generally be such so that the food strip becomes transparent or semi-transparent along the cut line so that the underlying support becomes visible to the naked eye. In embodiments of the invention, the segmenting cuts may penetrate the food strip to a depth of at least about 90%, preferably at least about 95%, for example about 99% or more of its thickness. In embodiments where the food strip is completely cut through or almost completely cut through, slight cold flow which results in only rejoining or adhesion at the bottom of the cut may be permitted.

In use, the knife edge 32 of the rotating segmenting roller 30 effectively segments multiple parallel strips of food 38 supported on a strip of support material 17 without scoring or cutting the underlying strip of support material 17. Each of the multiple parallel continuous strips of food 38 supported on a support material 17 may travel perpendicular or substantially perpendicular to the axis of rotation of the roller 30, and abut the roller surface 33 at least substantially perpendicular to the series of knife edges 32 within each circumferential band or lane 31 on the roller surface 33. Thus, the rotation of the roller 30 segments each strip of food 38 at a predetermined interval corresponding to the circumferential spacing between the knife edges 32.

Each knife 32 edge within the series of circumferentially spaced knife edges may be a continuous knife edge that segments each strip of food all the way across its width. Continuous knife edges may define various designs that extend all the way across the width of a strip of food 38, including, for example, a straight line (FIG. 2), a lightning bolt, letters, numbers, musical notes or symbols, mathematical symbols, borders of puzzle pieces, matching tabs and sockets or plug-in designs, squiggly or crooked lines, and mixtures and combinations thereof. In other embodiments, each knife edge 32 within a series of circumferentially spaced knife edges may be a discontinuous knife edge defining various designs to perforate each strip of food all the way across its width.

Figures 3A, 3B, 3C:
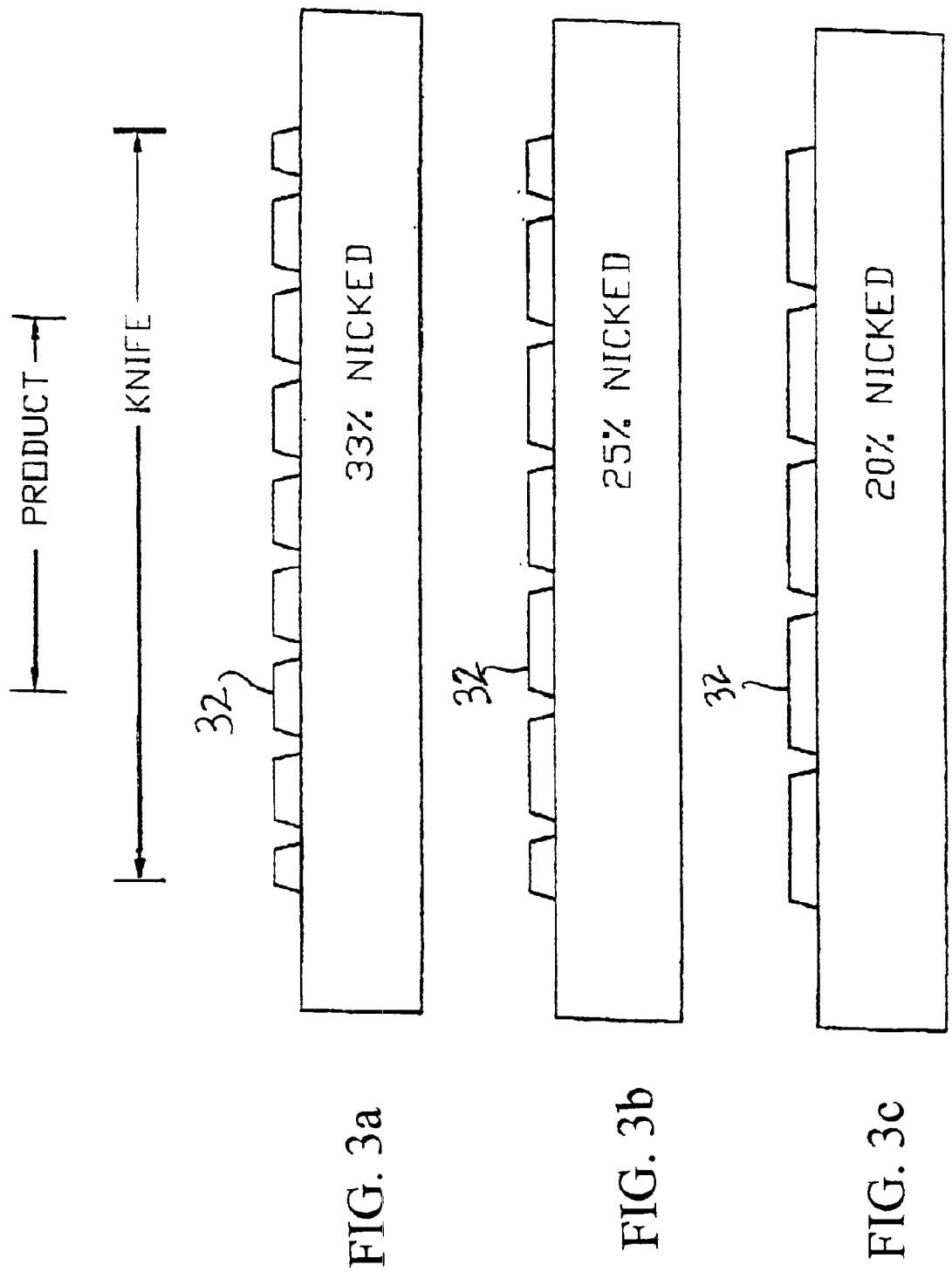
FIGS. 3a, 3b and 3c depict a series of notched or serrated segmenting edges.

As shown in FIGS. 3a, 3b and 3c, respectively, various designs of discontinuous knife edges 32 may define a serrated or notched straight edge that is 20% nicked, 25% nicked or 33% nicked. The phrase "% nicked" refers to that portion of the width of the top edge of the knife edge 32 which is removed to effect notching. Further, the phrase "% nicked" refers to that portion of the width of a segmented strip of food 38 which remains uncut after perforating and processing the strip of food. In embodiments of the present invention, the serrated straight edge for each segment may be from about 15% to about 50%, preferably from about 20% to about 33% nicked. The nicks or non-perforating portions, and the remaining perforating portions of a knife edge may leave from about 15% to about 50%, preferably from about 20% to about 33% of the width of the food strip uncut, with the remainder of the width being cut. The length of the serrated straight edge may be from about 1.25 to about 2.5 times, for example about twice the width of the strip of food.

In other embodiments of the invention, the surface 33 of the segmenting roller 30, shown in FIG. 2, may further comprise a plurality of radially protruding embossing, imprinting or engraving cups 34 defined by a knife edge 35 that forms a definite shape in the strips of food 38 as the roller 30 rotates. In general, the roller 30 comprises at least one embossing or imprinting cup 34 in each circumferential lane 31 on the surface 33 of the roller 30, corresponding to each of the multiple parallel strips of food 38. Preferably, a plurality of embossing or imprinting cups 34 are located in each circumferential lane 31, optionally spaced circumferentially from each other at a predetermined distance. The embossing or imprinting cups 34 can be disposed between adjacent radially projecting knife edges 32 that are used to effect segmenting. Thus, the embossing or imprinting cups 34 may be disposed to provide an embossment, figure, or shape completely within a given segment of food. Within each lane, some or all of the embossing or imprinting cups 34 may each be disposed between adjacent knife edges 32.

In other embodiments, one or more of the radially projecting knife edges 32 can be disposed so as to divide at least one of the embossing or imprinting cups 34. Thus, the embossing cups may form only part of a design within a given segment, for example a half or a third of a design, wherein the remainder of the design may be present on adjacent or non-adjacent embossing cups 34 within the same circumferential lane 31. Within each lane, some or all of the embossing cups 34 may each be divided by knife edge 32.

In a preferred embodiment of the invention, the embossing cups 34 are divided so that one-half of the embossing cup 34 forms part of a design or shape within a given segment of a rolled food item and the remaining portion of the embossing cup 34 forms the remaining portion of the shape or design within a non-adjacent segment of the rolled food item. In this way, the consumer can put together the matching segments of a rolled food item like puzzle pieces to form the entire design or shape. In addition, knife edge 32 can be used to form segments so that the divided embossed segment match like a puzzle piece, for example, with a male-female socket or plug-in design so that the matching segments hook or fit neatly together.

Embossing cups 34 can be used to form shapes such as a dinosaur, a fish, a bone, a shark, a whale, an orca, a cat or a dog, a teddy bear, a paw print, and any portion thereof. The embossing cups 34 generally form the outline of a design but can also form one or more parts, e.g., a whale fin, or other details, e.g., a dog's nose, within a design.

The height of the radially projecting knife edge 32 used to segment a strip of food 38 may be slightly greater than the height of the radially protruding knife edge 35 used to emboss or imprint a strip of food 38. Radially projecting knife edge 32 is used to segment a flowable strip of food 38 and so may cut all the way or nearly all the way through the strip of food 38 so that "cold flow" of the food during and after processing will not adversely affect the removability of a segment from a strip of food 38. As a part on an embossing cup 34, a radially protruding knife edge 35 is only used to impart a design into a strip of food 38 and must be of a sufficient height so that the design embossed in a strip of food 38 is not smudged or smeared over during or after processing. Like knife edge 32, knife edge 35 may have a blunt, e.g., a flat or rounded top edge. For example, the top edge may be defined by a substantially flat side surface and a substantially flat edge surface or top surface perpendicular thereto.

The construction of the segmenting roller 30 may include a cylinder 41 mounted on an axle 44 which is rotably mounted on a support and driven by a conventional drive means, such as a drive belt 45 or gear. The surface of the cylinder 41 may be adapted to detachably receive around its entire circumference arcuate plastic plates 50 that are at least as wide as the pre-slit strips of support material, with each of the plates 50 subtending a small arc, for example about 30 degrees. The arcuate plastic plates 50 provide the segmenting and embossing surfaces 33 of the roller 30 and define the parallel circumferential lanes 31 when a sufficient number of said plastic plates 50 are attached to the roller 30 to fully encircle the cylinder 41. For example, when a series of twelve arcuate plastic plates 50 subtending an angle of 30 degrees are attached to a cylinder 41 to define a ring around the cylinder, a single circumferential lane 31 is formed on the surface 33 of the roller 30. In an embodiment of the present invention, the roller 30 comprises 2 to 40 or more, preferably about 3 to about 20, most preferably about 8 to about 16 parallel circumferential lanes on its surface and has sufficient width to simultaneously segment the same number of parallel strips of food 38 supported on a pre-slit strip of support material 17. Accordingly, a single assembly line 22 can be configured to accommodate 2 to 40 or more, preferably about 3 to about 20, most preferably about 8 to about 16 parallel strips of food 38 supported on a pre-slit strip of support material 17.

Thus, each strip of food 38 can be embossed with several figures or with several partial figures that can be matched together by removing and fitting together matching segments to form whole figures. Still further, the figures created by embossing cups 34 can be rapidly and conveniently varied and changed according to market appeal. Each of the multiple strips of food 38 can be embossed with the same figure(s) or each strip of food 38 can be embossed with a different particular figure.

The circumference of the roller 30 may vary according to need, but is usually large enough to enable the roller 30 on a single rotation to segment and emboss a continuous strip of food 38 long enough to produce the desired rolled food item. This arrangement permits avoidance of repeating an embossing pattern in a single rolled food item. Thus, the circumference of the roller 30 may range from about 6 inches to about 1 meter, or about 39 inches which is the range of lengths desired for a single rolled food item. In an embodiment of the present invention, 12 arcuate plastic plates each forming an arc about 2½ inches long encircle the roller so that the total circumference is about 30 inches.

Figure 4:
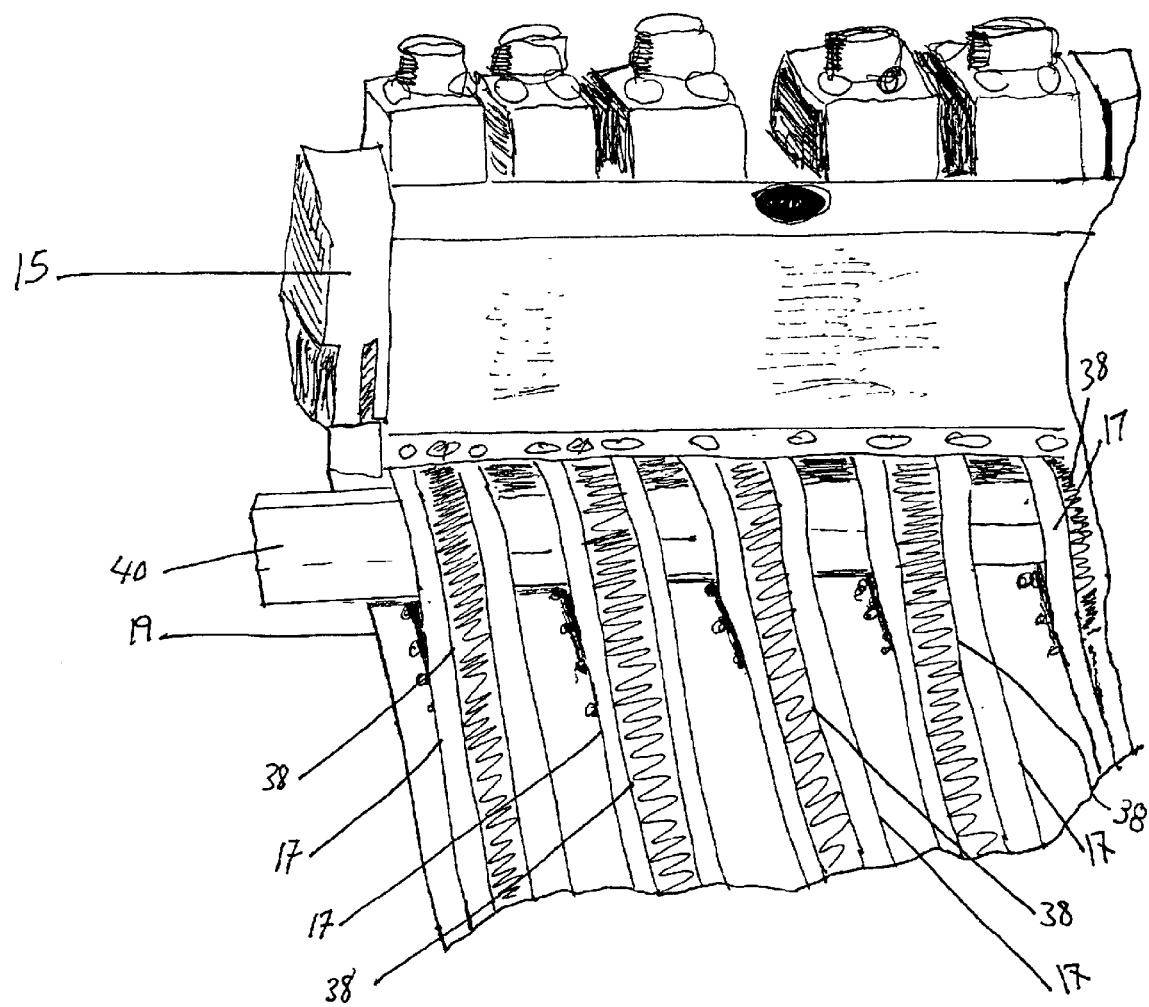
FIG. 4 depicts a partial view of an extruder and guide device.

In a preferred embodiment of the present invention, as shown in FIGS. 1 and 2, a metal spacer bar or guide means 40 may be disposed both upstream and downstream of the rotating segmenting roller 30. As shown in FIG. 4, a guide means 40 may also be disposed downstream and adjacent to the food extruder 15. The guide means 40 is adapted to preserve the parallel orientation of the multiple parallel continuous strips of food 38 during processing or, more specifically, during the conveyance of the multiple strips 38 of food as deposited on pre-slit strips of support material 17 from the extruder 15 to the winding or roll-forming unit 24. The metal spacer bar may include a plurality of flat indentations along its length for guiding the strips of support material 17 and preventing substantial lateral movement of the support material 17. The width of the indentations may be slightly wider than the width of the support material 17 so as to avoid excessive contact of the sides of the support material 17 with the internal walls of the indentation.

Figure 5:
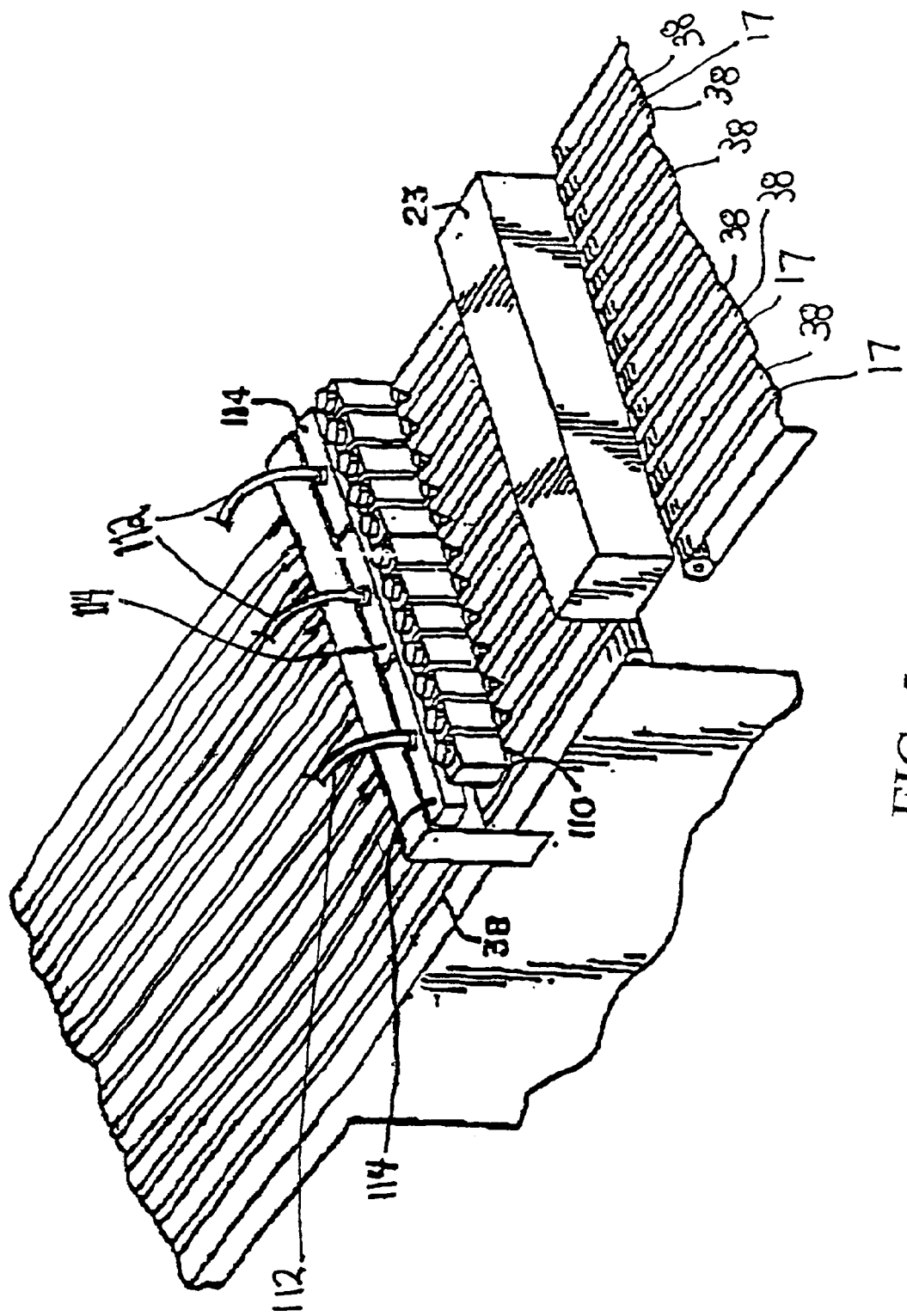
FIG. 5 depicts a lengthwise cutter and glue applicator nozzles.

Continuing along assembly line 22, as shown in FIG. 1, after segmenting and optional embossing or imprinting, the strips of food 38 and support material 17 are passed onto a second perforated conveyor 26. It can then be appreciated that conveyor 26 cools the strips of food on support material to facilitate rolling up the food. The segmented food strips may optionally be passed under a glue applicator 110 as shown in FIG. 5. As shown in FIG. 1 and FIG. 5, the segmented food strips are then passed to a lengthwise cutter 23 which cuts the leading and the trailing end of the food strips 38 and the support strips to a desired length. As shown in FIG. 1, the cut food strips are then transferred to timing feed belt 26 which accelerates them into winding unit 24. Once wound, the rolled food product drops down onto finished food conveyor 28.

In preferred embodiments, the segmented food strips are passed under a glue applicator 110 as shown in FIG. 5, which applies a drop of an edible glue such as a confectionary glue, corn syrup composition, or icing to the top of the food surface near the trailing end of the product. Preferably, an edible glue is applied on top of the food surface near the trailing end of the product, whereby when the product is rolled the edible glue holds the trailing end of the product against the next adjacent layer thereby obviating the need for a strapping band or label to keep the roll wound.

Glue application can be accomplished, for example, using an air actuated nozzle 110 for each strip of product being produced. FIG. 5 shows a system for applying a drop of a corn syrup composition simultaneously on each of twelve adjacent strips of food material 38. In the presently preferred embodiment, the nozzles 110 are located along assembly line 22 of FIG. 1 after the segmenting roller 30 but prior to rotary knife 23. Thus the glue is applied while the strips 38 are still continuous. The placement of the nozzles can be adjusted so that the edible glue or corn syrup composition, can dry to a tacky or adhesive state as the product strip moves along. The corn syrup will then be tacky by the time the trailing end of the product is wound around the other layers. In this way the trailing end is held against the rest of the roll, keeping it in a wound-up state.

Glue or corn syrup is preferably held in a reservoir (not shown) and pumped through hoses 112 to three headers 114 which each supply four nozzles 110. The nozzles may be air actuated. When triggered, they each dispense one drop of corn syrup onto the strip of food 38 underlying the nozzle 110. The timing for triggering the nozzles will depend on the line speed, and is preferably triggered by a controller that also actuates the rotary knife 23. In this way, the nozzles 110 can be synchronized so that the drop of corn syrup is placed in the correct spot on the traveling strip of food material 38. Presently it is preferred to deposit the drop about ½ inch from what will become the trailing end of the product.

After glue is applied, the strips of food 38 are then passed to a lengthwise cutter 23 as shown in FIG. 5, such as a rotary knife, that cuts the strips 38 into predetermined lengths with the edible glue being located at the trailing end. The cutter 23 will also cut a trailing end of the food strips 38 and the support strips 17 to create items having a desired length, for example about 6 inches to about 1 meter (39 inches) long, preferably about 20 inches long. Accordingly, the cutter 23 cuts strips of food 38 and support material 17 to a finite length, with each strip 38, 17 having a leading end and a trailing end. Cutter 23, like the segmenting roller 30, may be belt driven, gear driven, or driven by another means known in the art.

Figure 6:
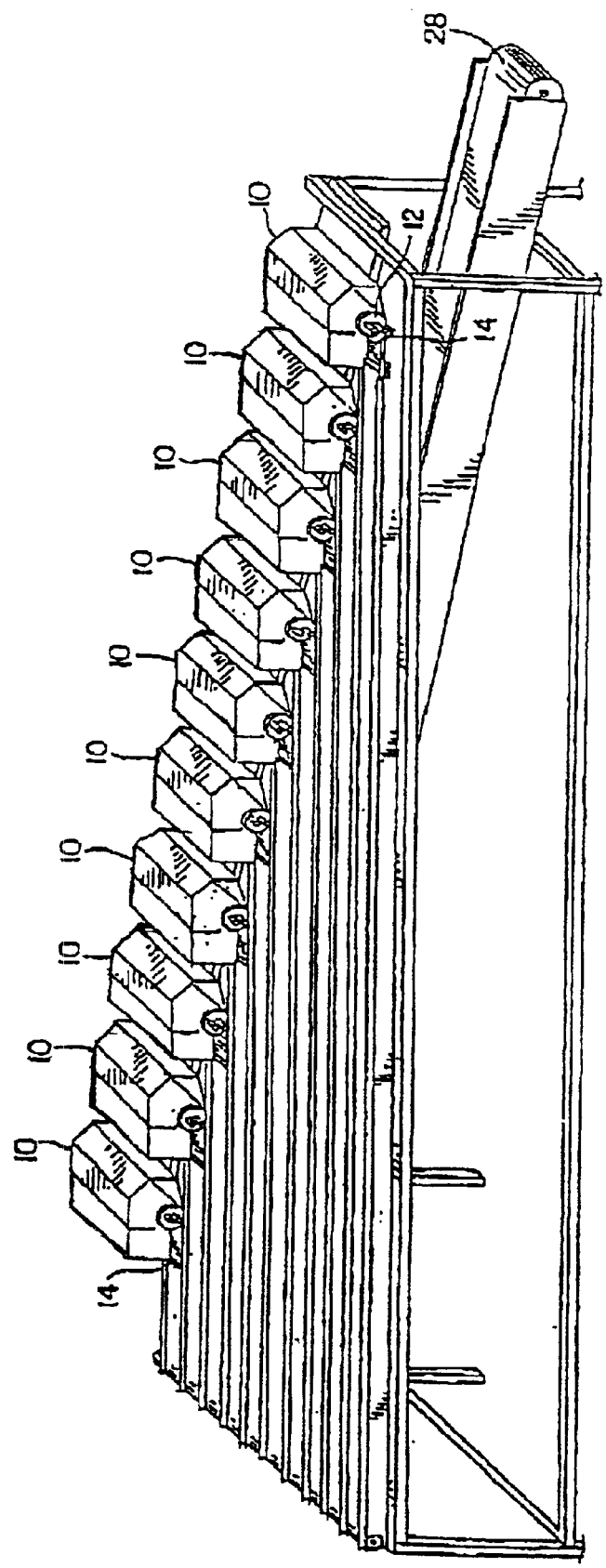
FIG. 6 depicts an embodiment of the winding unit.

As shown in FIG. 1, after the multiple strips of food 38 are cut into predetermined lengths they are transferred to timing feed belt 26 where the strips are accelerated into the winding unit 24, shown in FIGS. 6, 7a, 7b, 7c, and 7d. As shown in FIG. 6, the winding unit 24 may include one or more winding mechanisms 10, one for each processed, cut strip of food product 38. Each cut strip of food product 38 is wound individually in the rolling unit 12 of one of the winding mechanisms 10. Afterwards, the individually rolled food product drops down to a finished food conveyor 28 as shown in FIG. 1 and FIG. 6. The rolled food product is then conveyed on the finished food conveyor 28 to a horizontal packaging machine (not shown).

To receive a strip of food product 38, winding mechanism 10 of the present invention may include a product feed guide 14 as shown in FIGS. 6, 7a, 7b and 7e of simple construction requiring low maintenance. The product feed guide 14 receives a strip of food product 38 and guides the strip to the rolling unit 12. The product feed guide 14 is located adjacent to a front support plate 34 (FIGS. 7a and 7b) and resembles a slide having a trough-like shape.

In other embodiments, the winding mechanism 10 may comprise a known fork roll-up winding mechanism such as the mechanism shown in U.S. Pat. No. 5,205,106, which is herein incorporated by reference in its entirety.

Preferably, the winding mechanism 10 comprises a retractable roll-up device 730, shown in FIGS. 7a and 7b and described with reference to FIGS. 7a–7e, which roll-up device is coupled to and rotatably propelled by a motor 32. Forced air roll-up device 730 is specifically adapted to be used in an embodiment in which no strapping or label is applied to hold the rolled food strip 38 closed. In an extended position, the roll-up device 730 extends beyond the front support plate 34 to receive the strip of food 38. As a strip of food product 38 is fed to the air winding tube 90, the strip of food product 38 fastens or hooks onto the roll-up device 730. In a retracted position (not shown), the roll-up device 730 retreats just beyond the front support plate 34 so as to allow the rolled up strip of food product 38 to fall free. Upon retracting the roll-up device 730, the rolled food strip 38 abuts the front support plate 34 and falls from the roll-up device 730.

As shown in FIG. 7a, a preferable roll-up device 730 uses a motor 32 reciprocatingly mounted on a front support plate 34 and controlled by a product detector 48, as well as the product guide 14. An air winding tube 90 protrudes through a product guide extractor 91. Air winding tube 90 moves back and forth between an extended position and a retracted position. An air hose 92 connected to an air solenoid valve 93 brings compressed air from a source (not shown) to a stationary air housing 94 surrounding the back end of the air winding tube 90.

As best seen in FIGS. 7c and 7d, air travels through a passageway 95 in the air winding tube 90 from its back end out to where the air can exit through holes 96 that face toward the inside of air winding tube 90, just behind the product contacting surface 97. As the strip of food product 38 enters the longitudinal slot between the product contacting surface 97 and the air holes 96, the product detector 48 actuates air solenoid valve 93 and air is forced out of holes 96. The air blows the leading end of the strip of food product 38 upwards so that the product strip 38 curves around the product contacting surface 97 (FIG. 7e) Then as motor 32, shown in FIG. 7a, rotates air winding tube 90, the product contacting surface pulls the leading end of the product and starts wrapping the product around the outer surface of air winding tube 90. FIG. 7e also shows a partially wound up roll of food product 38 with a drop of adhesive 125 near the trailing end.

As best seen in the exploded view of FIG. 7c, the air winding tube 90 has four air holes 96 spaced along the longitudinal slot into which the product passes. The air winding tube has a hole 98 on its back end which allows air from the stationary air housing 94 into passage 95. The opposite end of passage 95 is blocked by a plug 99, sealing the outer end of passage 95.

The stationary air housing 94 includes a threaded inlet 101 into which air hose 92 may be secured. O-rings 102 and 103 fit on grooves 104 and 105 of air winding tube 90 to seal the air winding tube 90 back end within the stationary air housing 94. A washer 106 and snap ring 107 hold the stationary air housing 94 and air winding tube 90 together.

In the preferred roll-up device 730, the product enters the air winding tube 90 until the leading end stops against the back wall of air winding tube 90. The motor 32 starts turning after a delay of 5 milliseconds from when the air is forced through holes 96. As the air winding tube 90 starts to spin, because the leading end of the product strip is forced toward the top of the air winding tube 90, centrifugal force tends to force the leading end of the product against the inside wall of the tube and hold it in that position. Preferably the product contacting surface 97 has a sharp edge that penetrates the top side of the food product 38, thus getting a good grip to hold the product in the tube as the tube 90 starts to spin.

In other embodiments of the apparatus of the present invention, a sensor may be provided which is adapted to time the rotation of the winding mechanism 10 so that the winding mechanisms begin rotating upon entry of a leading edge of continuous multiple parallel strips of food supported on a strip of support material into a space formed within the winding unit 24. For example, to synchronize the operation of the air winding tube 90 with the approaching leading edge of the support material, winding unit 24 comprises a product detector 48 (FIGS. 7a and 7b) for sensing the presence of a strip of food product 38. The product detector 48 may be of any type commonly known to those skilled in the art. In the preferred embodiment of the present invention, the product detector 48 is an electronic or photo-electric eye positioned on the front plate support 34. Once the presence of a strip of food product 38 is sensed, an electronic signal is sent from the eye 48 to a relay or other type of switching device. This relay in turn sends an electronic signal to the motor 32 to start turning the roll-up device 730.

It should be recognized that a series of individual conveyors 19 and 26 advance the strips of food 38 and support material 17 between the sections of assembly line 22. It can be further appreciated that the speeds of the individual conveyors can be increased after the strips of food 38 and support material 17 have been cut into lengths to space out the lengths and create gaps between the lengths of the strips of food 38 and support material 17. The operation of the rotating segmenting roller 30, glue applicator 110, lengthwise cutter 23 and winding unit 24 can be controlled according to the movement of the strips of food 38 and support material 17 by any suitable means such as a conventional programmable logic controller or a sensor means, such as an electronic or photoelectric eye.

In operating assembly line 22, the method of making a segmented rolled food product comprises the steps of providing multiple continuous parallel strips of a flowable food product 38 and providing multiple continuous parallel pre-slit support material strips 17, feeding the pre-slit support material strips onto a carrier conveyor 19 and depositing food strips 38 by extrusion onto each of the support material strips 17. The next steps are conveying and cooling the multiple continuous parallel supported food strips, feeding the supported food strips while the food is still flowable into a gap defined by the underside of a rotating segmenting roller 30 and an upper anvil surface of a conveyor 19 thereby segmenting and/or perforating the food strips 38 across the entire width of the food strips at a predetermined interval. These steps are followed by further conveying and slight ambient air drying of the segmented, supported food strips under a glue applicator 110 and applying a drop of an edible glue to the segmented supported food strips. Occurring next are further conveying and slight ambient air drying of the segmented, supported food strips to a non-flowable state and through a cutting means 23, such as a rotating cutter. The cutter is adapted to cut all the way through both the food strips 38 and the support strips 17 to form a leading end and a trailing end of the support strips 17 and food strips 38. Then, the cut, segmented supported food strips are subjected to still further conveying and slight ambient air drying, and insertion into a winding unit 24. The cut and segmented multiple parallel supported food strips are then rolled around the leading end of the support strips to form a rolled food product. The present invention provides a continuous process of making a segmented rolled food item.

Figure 8:
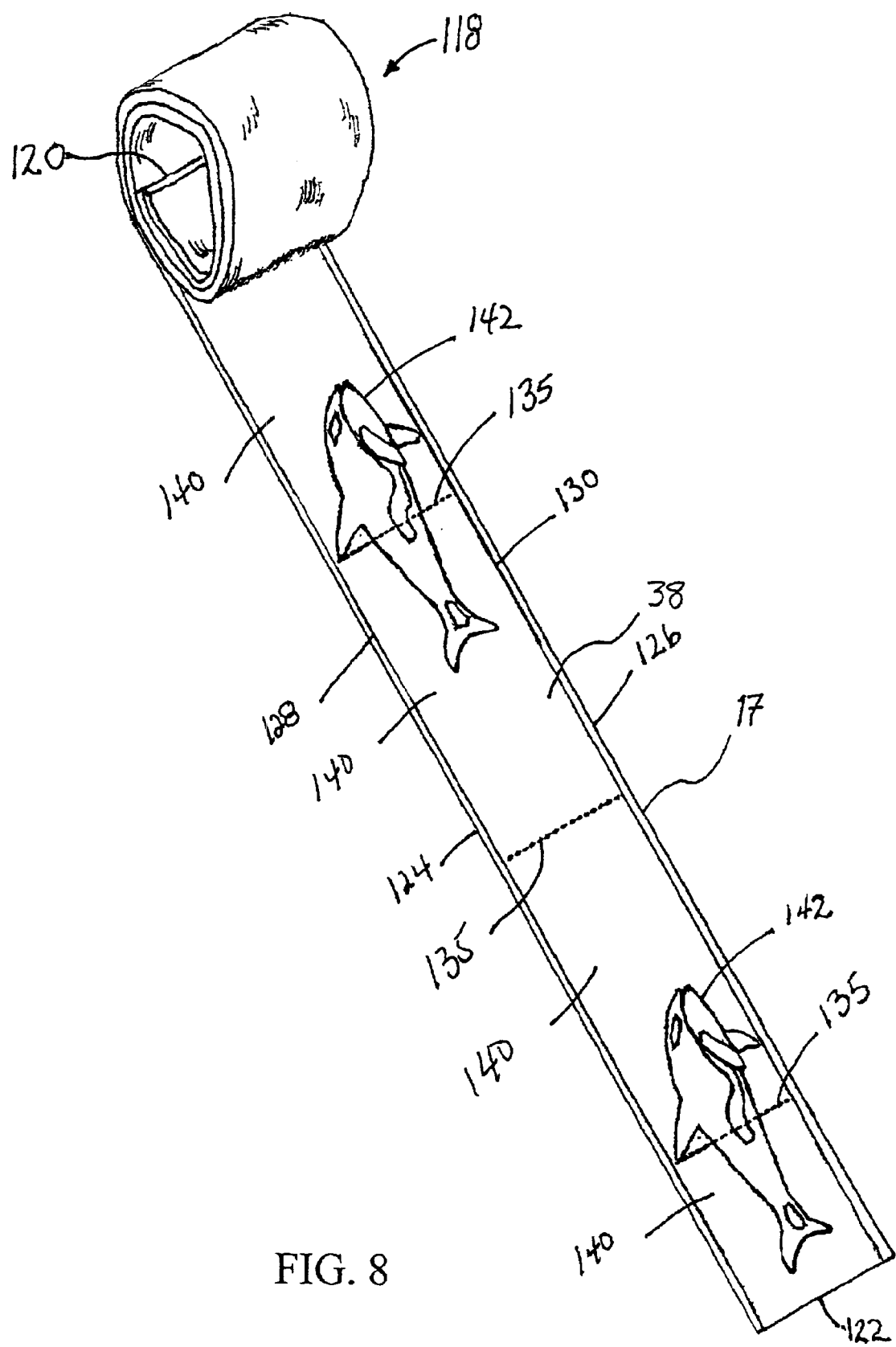
FIG. 8 depicts an embodiment of a rolled fruit item according to the present invention having an orca embossed on a strip of food which is segmented by perforation.

A partially unrolled food item 118 is shown in FIG. 8. As shown in FIG. 8, the segmented rolled food items 118 according to the present invention include a strip of support material 17 having a leading end 120 and a trailing end 122 defining its length and a definite width. A strip of food 38 is supported upon the strip of support material 17 and has a length which does not extend beyond the leading and trailing ends 120, 122, respectively, of the support material. The strip of food 38 may have a width no wider than the width of the support material 17. In embodiments of the present invention, the width of the strip of food 38 may be from about 45% to about 95%, for example from about 55% to about 65%, of the width of the support material 17. The item is rolled around the leading end 120 into a roll having multiple rotations with the strip of support material 17 located on the outside of the roll. The support material 17 has first and second side edges 124, 126, respectively, defining its width. In an embodiment of the present invention, the length of the strip of food 38 may be equal to the length of the support material 17. The strip of food 38 can have a width which does not extend beyond the first and second edges 124, 126 of the support material 17. Further, a rolled food item 118 can have side edges 128, 130 of the strip of food 38 that are generally about equally spaced from the first and second edges of the strip of support material 17. For example, a rolled food item 118 can have a space between the side edges 128, 130 of the strip of food 38 and the first and second edges 124, 126, respectively, of the strip of support material 17 of about one-eighth inch.

In the rolled food item 118 of the present invention, the strip of support material 17 and the strip of food 38 supported thereon are rolled around the leading end 120 into a roll having multiple rotations, with the strip of support material 17 located on the outside of the roll. The strip of food 38 supported upon the strip of support material 17 may have segmented or perforated cuts 135 at a predetermined interval so that one or more segments 140 at the trailing end 122 of the roll can be broken off of the strip of food 38 by pulling the one or more segments 140 and the rest of the strip 38 apart with the fingers.

The present invention provides a segmented, and optionally embossed, imprinted, or engraved, rolled food item 118 wherein the strip of support material 17 is free of segmenting and embossing, imprinting, or engraving. The rolled food item 118 can comprise an embossed or imprinted strip of food 38 having embossed or imprinted shapes 142 that are arranged in several different ways. The rolled food item 118 can comprise a strip of food 38 embossed or imprinted with shapes to provide a boss or imprint contained entirely within a single segment 140. Alternatively, as shown in FIG. 8, the rolled food item 118 can comprise a strip of food 38 embossed or imprinted with shapes to provide a boss or imprint 142 which is divided between segments 140 so as to be contained partially within a first segment and partially within a second segment. The boss, imprint or engraving 142 can be divided between three or more segments 140 as well. Also, the divided bosses, imprints, or engravings 142 can be arranged so that the first segment either is adjacent or is not adjacent to the second segment, or third segment, etc.

We claim:

1. A method of making a multiplicity of rolled food products comprising:
   conveying while cooling multiple, continuous, at least substantially parallel strips of a flowable food product, wherein each food strip as supported on a strip of support material,
   segmenting or perforating each of said food strips across the entire width of the food strip while the food is still flowable to form a multiplicity of multi-segmented food strips, each multi-segmented food strip having a plurality of separable food segments,
   cutting all the way through each of said multi-segmented food strips and the respective strip of support material to form a leading end and a trailing end of each multi-segmented food strip and the respective strip of support material, and
   rolling each of said cut, multi-segmented food strips and the respective strip of support material around said leading end to form a multiplicity of rolled food products,
   wherein each rolled food product has a plurality of separable food segments obtained by segmenting or perforating across the entire width of the food strip.

2. A method of making a multiplicity of rolled food products according to claim 1 wherein said segmenting or perforating further comprises embossing or imprinting to form a definite shape in each of said strips of food.

3. A method of making a multiplicity of rolled food products according to claim 2 wherein said embossing or imprinting results in at least one shape disposed within a single segment of each said strips of food.

4. A method of making a multiplicity of rolled food products according to claim 2 wherein said embossing or imprinting results in a shape which is divided between at least two separate segments of at least one of said strips of food.

5. A method of making a multiplicity of rolled food products according to claim 4 wherein said two separate segments are not adjacent each other.

6. A method of making a multiplicity of rolled food products according to claim 1 wherein said segmenting or perforating comprises feeding said multiple continuous strips of food supported on a support material into a gap defined by an upper anvil surface and the underside of a rotating segmenting roller,
   said rotating segmenting roller having a plurality of circumferential lanes on the roller surface, each circumferential lane containing a series of circumferentially spaced radially projecting knife edges that are disposed for cutting entirely across the width of the strips of food.

7. A method of making a multiplicity of rolled food products according to claim 6 wherein, in said segmenting or perforating, said radially projecting knife edges are spaced so as to segment each of said strips of food at a predetermined interval.

8. A method of making a multiplicity of rolled food products according to claim 6 which further comprises guiding each of said multiple strips of food supported on a strip of support material so as to keep them at least substantially parallel to and separate from each other during processing.

9. A method of making a multiplicity of rolled food products according to claim 8 wherein, in said guiding, each of said multiple strips of food supported on a strip of support material is conveyed through at least one guide located in said upper anvil surface.

10. A method of making a multiplicity of rolled food products according to claim 1 which further comprises guiding each of said multiple parallel strips of food supported on a strip of support material so as to keep them at least substantially parallel to and separate from each other during processing.

11. A method of making a multiplicity of rolled food products according to claim 1 wherein said segmenting or perforating effectively segments each of said multiple strips of food without segmenting or perforating said strip of support material.

12. A method of making a multiplicity of rolled food products according to claim 6 wherein edible adhesive is applied near the trailing end of each of said strips of food and thereby holds the trailing end against the next adjacent layer in the rolled food product.

13. A method of making a multiplicity of rolled food products according to claim 1 wherein said strips of food product are cooled to a temperature of from about 75° F. to about 90° F. for said segmenting or perforating.

14. A method of making a multiplicity of rolled food products according to claim 6 wherein said strips of food product are cooled to a temperature of from about 75° F. to about 90° F. for said segmenting or perforating.

15. A method of making a multiplicity of rolled food products according to claim 6 wherein said circumferentially spaced knife edges are continuous knife edges.

16. A method of making a multiplicity of rolled food products according to claim 6 wherein said circumferentially spaced knife edges are discontinuous knife edges.

17. A method of making a multiplicity of rolled food products according to claim 5 wherein said continuous knife edges are in the shape of a straight edge, a lightning bolt, a letter, a number, a musical note or symbol, a mathematical symbol, a border of a puzzle piece, a matching tab and socket or plug-in design, a squiggly or crooked line, or a combination thereof.

18. A method of making a multiplicity of rolled food products according to claim 6 wherein said discontinuous knife edges are in the shape of a serrated or a notched straight edge that is about 15% nicked to about 50% nicked.

19. A method of making a multiplicity of rolled food products according to claim 6 wherein said circumferentially spaced knife edge is rounded or substantially flat in cross-section.

20. A method of making a multiplicity of rolled food products according to claim 1 wherein from about 8 to about 16 multiple continuous strips of food supported on a strip of support material are processed simultaneously.

21. A method of making a multiplicity of rolled food products according to claim 1 wherein each of said strips of food comprises a dehydrated fruit puree.

* * * * *